(12) United States Patent
Takesue et al.

(10) Patent No.: US 6,624,221 B2
(45) Date of Patent: Sep. 23, 2003

(54) RESIN COMPOSITION FOR GOLF BALL AND GOLF BALL

(75) Inventors: Rinya Takesue, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 225 days.

(21) Appl. No.: 09/866,756

(22) Filed: May 30, 2001

(65) Prior Publication Data

US 2002/0013421 A1 Jan. 31, 2002

(30) Foreign Application Priority Data

Jun. 9, 2000 (JP) ......................... 2000-173543

(51) Int. Cl.[7] .................. C08L 91/06; C08K 5/09; A63B 37/12; A63B 37/06
(52) U.S. Cl. .............. 524/277; 524/322; 524/394; 524/398; 524/399; 524/400; 473/351; 473/365; 473/376; 473/377; 473/378; 473/379; 473/380; 473/381; 473/382; 473/383; 473/384
(58) Field of Search .................. 524/277, 322, 524/394, 398, 399, 400; 473/351, 365, 376, 377, 378, 379, 380, 381, 382, 383, 384

(56) References Cited

U.S. PATENT DOCUMENTS

| | | | |
|---|---|---|---|
| 3,404,134 A | 10/1968 | Rees | |
| 3,959,539 A | 5/1976 | Waggoner | |
| 4,526,375 A | 7/1985 | Nakade | |
| 4,984,804 A | 1/1991 | Yamada et al. | |
| 4,999,404 A | 3/1991 | Matsuki | |
| 5,019,320 A | 5/1991 | Hasegawa et al. | 524/908 |
| 5,306,760 A | 4/1994 | Sullivan | 524/400 |
| 5,312,857 A | 5/1994 | Sullivan | 524/400 |
| 5,439,227 A | 8/1995 | Egashira et al. | 273/228 |
| 5,559,188 A | 9/1996 | Egashira et al. | 525/74 |
| 5,605,968 A | 2/1997 | Egashira et al. | |
| 5,779,561 A | 7/1998 | Sullivan et al. | |
| 5,803,831 A | 9/1998 | Sullivan et al. | |
| 5,824,740 A | 10/1998 | Yabuki et al. | 525/71 |
| 5,902,855 A | 5/1999 | Sullivan et al. | |
| 5,929,189 A | 7/1999 | Ichikawa et al. | 528/76 |
| 5,948,859 A | 9/1999 | Sano et al. | |
| 5,994,470 A | 11/1999 | Tanaka et al. | 525/183 |
| 6,034,182 A | 3/2000 | Kashiwagi et al. | |
| 6,100,321 A | 8/2000 | Chen | |
| 6,319,153 B1 | 11/2001 | Nesbitt et al. | |
| 6,325,731 B1 | 12/2001 | Kennedy, III et al. | |
| 6,329,458 B1 * | 12/2001 | Takesue et al. | 524/400 |
| 2002/0091188 A1 * | 7/2002 | Statz et al. | 524/400 |

FOREIGN PATENT DOCUMENTS

| | | |
|---|---|---|
| GB | 1113409 | 5/1968 |
| JP | 5-3931 | 1/1993 |
| JP | 9-117532 | 5/1997 |
| JP | 9-313643 | 12/1997 |
| JP | 10-305114 | 11/1998 |
| WO | WO 98/46671 | 10/1998 |
| WO | WO 00/23519 A1 | 4/2000 |
| WO | WO 01/29129 A1 | 4/2001 |

* cited by examiner

Primary Examiner—Peter Szekely
(74) Attorney, Agent, or Firm—Sughrue Mion, PLLC

(57) ABSTRACT

A resin composition comprising, in admixture, (A) a specific thermoplastic resin component, (B) at least one wax component selected from among (b-1) a fatty acid having 20–80 carbon atoms and/or a derivative thereof and (b-2) an oxidized natural wax and/or derivative having a neutralization value of 60–190 mg KOH/g, and optionally, (C) a basic inorganic metal compound capable of neutralizing acid groups in the thermoplastic resin component (A) and/or the wax component (B) is improved in flow, moldability and heat resistance and thus suitable to form a layer of a golf ball which exhibits improved rebound and distance properties.

19 Claims, No Drawings

RESIN COMPOSITION FOR GOLF BALL AND GOLF BALL

This invention relates to resin compositions for golf balls having good flow characteristics and moldability and heat resistance. It also relates to high-performance golf balls formed thereof and endowed with outstanding rebound energy.

BACKGROUND OF THE INVENTION

Over the past few years, wide use has been made of ionomer resins in golf ball cover materials. Ionomer resins are ionic copolymers composed of an olefin such as ethylene in combination with an unsaturated carboxylic acid such as acrylic acid, methacrylic acid or maleic acid, wherein the acidic groups are partially neutralized with metal ions such as sodium, lithium, zinc or magnesium ions. They have excellent characteristics such as durability, rebound and scuff resistance, making them highly suitable as the base resin in golf ball cover material.

Ionomer resins account for most of the cover stock resin in current use and enable the production of golf balls having the above properties. However, golfers are always on the lookout for golf balls having a high rebound and excellent flight characteristics.

Related improvements taught by the prior art (see U.S. Pat. No. 5,312,857, U.S. Pat. No. 5,306,760, and International Application WO 98/46671) include cover stock in which a large amount of metallic soap is added to the ionomer resin to improve the cost and rebound characteristics of the ionomer cover stock. Such modifications have indeed resulted in better rebound than earlier golf balls with ionomer covers.

However, because a large amount of metallic soap is added to the ionomer resin in this prior-art cover stock, the fatty acids that form due to decomposition of the metallic soap vaporize during injection molding, generating a large amount of gas. The formation of a large amount of gas during injection molding causes molding defects. In addition, gas constituents settle on the surface of the molded article and greatly lower the paintability of the molded article. Moreover, although such cover stock in which a large amount of metallic soap has been added to the ionomer resin does exhibit a rebound which is about the same as or better than that of ionomer having the same degree of hardness, the improvement in rebound is not all that large. Indeed, depending on the type of metallic soap used, the moldability and rebound may in fact be severely compromised and fall far short of practical levels.

To prevent gas evolution during injection molding from an ionomer resin based cover material having magnesium stearate added thereto, the use of low molecular weight polyethylene wax as the dispersant is considered (Japanese Patent No. 2,712,740). Using polyethylene wax instead of magnesium stearate as the dispersant for ionomer resin cover material, the cover material is allegedly improved in molding and the ball produced therefrom is improved in durability. This cover material, however, has the problem that the cover material loses resilience and hardness as the amount of polyethylene wax blended increases. It is desired to overcome this problem.

It was recently proposed to use thermoplastic resins alone or in blend with ionomer resins as the cover inner or outer layer material for producing golf balls with a pleasant feel. The thermoplastic elastomers proposed thus far are polyolefin elastomers (Japanese Patent No. 2,924,706), polyester elastomers (Japanese Patent No. 2,570,587), urethane elastomers (JP-A 9-271538), styrene elastomers (JP-A 8-182776), polyamide elastomers (JP-A 8-155053), and polyolefin (JP-A 9-117532).

Nevertheless, a need exists for resin compositions for golf balls having heat resistance, flow and moldability. In the above-referenced patents, the dispersant that is compliant with a particular resin and allows a golf ball cover material to exhibit excellent physical properties is not under consideration, and problems are left with respect to pigment dispersion.

SUMMARY OF THE INVENTION

An object of the invention is to provide a resin composition for a golf ball which has good flow, moldability and heat resistance and is improved in pigment dispersion and surface preparation after curing so that it is best suited as cover material. Another object of the invention is to provide a high-performance golf ball formed thereof and having improved rebound.

The above and other objects are achieved by the resin composition for the golf ball and the golf ball defined below.

In one aspect, the invention provides a resin composition for a golf ball comprising, in admixture,
  (A) 100 parts by weight of at least one thermoplastic resin component selected from the group consisting of (a-1) an olefin-unsaturated carboxylic acid random copolymer and/or an olefin-unsaturated carboxylic acid-unsaturated carboxylate ternary copolymer, (a-2) a metal ion-neutralized product of an olefin-unsaturated carboxylic acid random copolymer and/or a metal ion-neutralized product of an olefin-unsaturated carboxylic acid-unsaturated carboxylate ternary copolymer, and (a-3) a thermoplastic elastomer, and
  (B) 0.1 to 10 parts by weight of at least one wax component selected from the group consisting of (b-1) a fatty acid having 20 to 80 carbon atoms and/or a derivative thereof, and (b-2) an oxidized natural wax and/or natural wax derivative having a neutralization value of 60 to 190 mg KOH/g.

In preferred embodiments, the resin composition has a melt index of at least 0.5 dg/min; component (b-1) is behenic acid and/or a derivative thereof; component (b-2) is oxidized montan wax and/or montan wax derivative; component (a-3) is polyolefin, an olefin elastomer, a urethane elastomer, a polyester elastomer, a styrene elastomer, a polyamide elastomer or a mixture of any.

In one preferred embodiment, component (A) contains at least one thermoplastic resin selected from the group consisting of (a-1) an olefin-unsaturated carboxylic acid random copolymer and an olefin-unsaturated carboxylic acid-unsaturated carboxylate ternary copolymer, and (a-2) a metal ion-neutralized product of an olefin-unsaturated carboxylic acid random copolymer and a metal ion-neutralized product of an olefin-unsaturated carboxylic acid-unsaturated carboxylate ternary copolymer. In this embodiment, wax component (B) is preferably selected from among a fatty acid, a metal soap, oxidized natural wax and saponified natural wax.

In another preferred embodiment, component (A) contains (a-3) the thermoplastic elastomer. In this embodiment, wax component (B) is preferably selected from among fatty acid, oxidized natural wax, esterified fatty acid, esterified natural wax, amidated fatty acid and amidated natural wax.

In another aspect, the invention provides a resin composition for a golf ball comprising, in admixture, (A) 100 parts by weight of at least one thermoplastic resin component selected from the group consisting of (a-1) an olefin-unsaturated carboxylic acid random copolymer and/or an olefin-unsaturated carboxylic acid-unsaturated carboxylate ternary copolymer, (a-2) a metal ion-neutralized product of an olefin-unsaturated carboxylic acid random copolymer and/or a metal ion-neutralized product of an olefin-unsaturated carboxylic acid-unsaturated carboxylate ternary copolymer, and (a-3) a thermoplastic elastomer, (B) 5 to 35 parts by weight of at least one wax component selected from the group consisting of (b-1) a fatty acid having 20 to 80 carbon atoms and/or a derivative thereof, and (b-2) an oxidized natural wax and/or natural wax derivative having a neutralization value of 60 to 190 mg KOH/g, and (C) 0.1 to 10 parts by weight of a basic inorganic metal compound capable of neutralizing acid groups in said thermoplastic resin component (A) and/or said wax component (B).

In preferred embodiments, the resin composition has a melt index of at least 0.5 dg/min; component (b-1) is behenic acid and/or a derivative thereof; component (b-2) is oxidized montan wax and/or montan wax derivative; wax component (B) is a fatty acid, a metal soap, oxidized natural wax, saponified natural wax or a mixture of any; the basic inorganic metal compound (C) is calcium hydroxide or magnesium oxide; and component (a-3) is at least one member selected from the group consisting of polyolefin, an olefin elastomer, a urethane elastomer, a polyester elastomer, a styrene elastomer and a polyamide elastomer.

In one preferred embodiment, component (A) contains at least one thermoplastic resin selected from the group consisting of (a-1) an olefin-unsaturated carboxylic acid random copolymer and an olefin-unsaturated carboxylic acid-unsaturated carboxylate ternary copolymer, and (a-2) a metal ion-neutralized product of an olefin-unsaturated carboxylic acid random copolymer and a metal ion-neutralized product of an olefin-unsaturated carboxylic acid-unsaturated carboxylate ternary copolymer.

In a further aspect, the invention provides a golf ball comprising a core and a cover formed around the core, the cover being formed of a material comprising the resin composition defined above.

A golf ball may also be embodied as comprising a core and a cover of at least two layers formed around the core, at least one layer of said cover being formed of a material comprising the resin composition defined above.

DESCRIPTION OF PREFERRED EMBODIMENTS

The resin composition for the golf ball of the invention is defined in one form as comprising (A) a thermoplastic resin component and (B) a wax component, and in another form as comprising (A) a thermoplastic resin component, (B) a wax component, and (C) a basic inorganic metal compound.

The thermoplastic resin component (A) and the wax component (B) are common in both the first and second forms.

First referring to the thermoplastic resin component (A), there is formulated at least one thermoplastic resin selected from the group consisting of (a-1) an olefin-unsaturated carboxylic acid random copolymer and/or an olefin-unsaturated carboxylic acid-unsaturated carboxylate ternary copolymer, (a-2) a metal ion-neutralized product of an olefin-unsaturated carboxylic acid random copolymer and/or a metal ion-neutralized product of an olefin-unsaturated carboxylic acid-unsaturated carboxylate ternary copolymer, and (a-3) a thermoplastic elastomer.

In the copolymers (a-1) and (a-2), the olefin has at least 2 carbons, but not more than 8 carbons, and preferably not more than 6 carbons. Illustrative examples include ethylene, propylene, butene, pentene, hexene, heptene and octene. Ethylene is especially preferred.

Suitable examples of the unsaturated carboxylic acid include acrylic acid, methacrylic acid, maleic acid and fumaric acid. Of these, acrylic acid and methacrylic acid are especially preferred.

The unsaturated carboxylate is preferably a lower alkyl ester of the foregoing unsaturated carboxylic acid. Illustrative examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate or isobutyl acrylate) is especially preferred.

The olefin-unsaturated carboxylic acid random copolymer and olefin-unsaturated carboxylic acid-unsaturated carboxylate ternary copolymer (a-1) may be prepared by using a known process to carry out copolymerization on the above ingredients in any desired proportion. It is generally recommended that the unsaturated carboxylic acid content within the copolymer be at least 2% by weight, preferably at least 6% by weight, and most preferably at least 8% by weight, but not more than 25% by weight, preferably not more than 20% by weight, and most preferably not more than 15% by weight. A low acid content may lower resilience, whereas a high acid content may lower processability.

The metal ion-neutralized products of olefin-unsaturated carboxylic acid random copolymer and olefin-unsaturated carboxylic acid-unsaturated carboxylate ternary copolymer (a-2) may be prepared by partially neutralizing acid groups in the above-mentioned random copolymer or ternary copolymer (a-1) with metal ions. Examples of metal ions which neutralize the acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. The use of ions such as $Na^+$, $Li^+$, $Zn^{2+}$ and $Mg^{2+}$ is preferred. The degree of random or ternary copolymer neutralization by these metal ions is not critical.

Such neutralized random or ternary copolymers may be prepared using a method known to the art. For example, suitable compounds of metal ions such as formates, acetates, nitrates, carbonates, hydrogencarbonates, oxides, hydroxides or alkoxides can be introduced onto the aforementioned olefin-unsaturated carboxylic acid random copolymer and olefin-unsaturated carboxylic acid-unsaturated carboxylate ternary copolymer (a-1) to thereby neutralize the acid groups with the metal ions.

The copolymers (a-1) and neutralized products thereof (a-2) are commercially available. Commercial examples of the olefin-unsaturated carboxylic acid random copolymer and olefin-unsaturated carboxylic acid-unsaturated carboxylate ternary copolymer include Nucrel AN4311, AN4318 and AN1560 (all produced by DuPont-Mitsui Polychemicals Co., Ltd.). Illustrative examples of the metal ion-neutralized products of olefin-unsaturated carboxylic acid random copolymer and olefin-unsaturated carboxylic acid-unsaturated carboxylate ternary copolymer include commercial ionomer resins, such as Himilan 1554, 1557, 1601, 1605, 1706, 1855, 1856 and AM7316 (all products of DuPont-Mitsui Polychemicals Co., Ltd.); and also Surlyn 6320, 7930, 8120, 8945 and 9945 (all products of E.I. DuPont de Nemours and Company). Among others, Nucrel AN4318, Nucrel 1560, Himilan 1706 and Himilan 1605 are advantageously used.

The thermoplastic elastomer (a-3) is preferably selected from thermoplastic elastomers which are free of acid groups and neutral to basic. Examples include polyolefin, olefin elastomers, urethane elastomers, polyester elastomers, styrene elastomers and polyamide elastomers. Of these, olefin elastomers, urethane elastomers and polyester elastomers are preferred for reasons of resilience.

Examples of the polyolefin include ethylene-butene copolymers, ethylene-hexene copolymers, ethylene-octene copolymers, and ethylene-butene-hexene copolymers. Commercial products may be used as the polyolefin. Commercial examples of ethylene-butene copolymers are EXACT 3024, 3025, 3027, 4011 and 4049; an exemplary ethylene-hexene copolymer is EXACT 3031; and examples of ethylene-butene-hexene copolymers are EXACT 4005 and 5010 (all available from Exxon Chemical Co.). Commercial examples of ethylene-octene copolymer include ENGAGE CL8001, CL8002, CL8003, EG8100, EG8150, EG8200, and EP8500 (Dow Chemical Co.).

The olefin elastomers include polyethylene and polypropylene and are preferably selected from multi-block copolymers comprising hard segments composed of polyethylene blocks and soft segments composed of hydrogenated polybutadiene, hydrogenated polyisoprene, EPDM or EPR blocks, preferably hydrogenated polybutadiene blocks, and crosslinked products thereof. Commercial products may be used as the olefin elastomer. Commercial examples are multi-block copolymers comprising polyethylene blocks and hydrogenated polybutadiene blocks available under the trade name of Dynalon 6100P, E6160P and 6200P (JSR Co., Ltd.), with Dynalon 6100P being especially preferred.

Preferred urethane elastomers are polyester polyurethane multi-block copolymers using aliphatic isocyanate. They are commercially available under the trade name of Pandex T7298, T7890 and T7295 (Dainippon Ink & Chemicals, Inc.), with Pandex T7298 being especially preferred.

Preferred polyester elastomers are polyether ester multi-block copolymers. They are commercially available under the trade name of Hytrel 4701, 4767, 4001, 4047 and 3046 (Dupont-Toray Polychemicals Co., Ltd.), with Hytrel 4001 being especially preferred.

The styrene elastomers are exemplified by styrene base block copolymers comprising hard segments composed of polystyrene and soft segments composed of hydrogenated polybutadiene, hydrogenated polyisoprene, EPDM or EPR blocks, preferably hydrogenated polybutadiene blocks. Commercial products may be used as the styrene elastomer. Commercial examples are multi-block copolymers comprising styrene blocks and hydrogenated polybutadiene blocks available under the trade name of Toughtec H1042, H1052, H1075, H1031, H1041, H1065 and H1051 (Asahi Chemical Industry Co., Ltd.).

The polyamide elastomers include multi-block copolymers comprising hard segments composed of polyamide and soft segments composed of polyether or polyester, which are commercially available under the trade name of Pandex 4033, 3533 and 2533 (ATOCHEM).

In the practice of the invention, the thermoplastic elastomer (a-3) may be selected from the aforementioned thermoplastic elastomers and used alone or in admixture of any.

The wax component (B) is common to the first and the second forms and at least one member selected from the group consisting of (b-1) a fatty acid having 20 to 80 carbon atoms and/or a derivative thereof, and (b-2) an oxidized natural wax and/or natural wax derivative having a neutralization value of 60 to 190 mg KOH/g. Component (B) is effective for improving the flow of the resin composition for the golf ball and contributes to an outstanding increase in melt viscosity of the composition upon heating partially because it has a very low molecular weight as compared with the thermoplastic resin component (A). Additionally, the wax component (B) having a low molecular weight and an appropriate acid or derivative content is able to endow the composition with heat resistance and compatibility without detracting from the rebound of cured composition.

The component (b-1) may be selected from unsaturated fatty acids whose alkyl groups have double or triple bonds and saturated fatty acids whose alkyl groups consist of single bonds. In either case, the fatty acids generally have at least 20 carbon atoms and up to 80 carbon atoms, especially up to 40 carbon atoms per molecule. A less number of carbon atoms fails to achieve heat resistance improvement and because of an increased acid content, fails to improve flow characteristics. Too large a number of carbon atoms gives a larger molecular weight and lowers the flow-improving effects.

No particular limit is imposed on the neutralization value of (b-1). It is generally recommended that (b-1) has a neutralization value of 60 to 190 mg KOH/g, especially 100 to 180 mg KOH/g. Too low a neutralization value may detract from resilience whereas too high a neutralization value may detract from flow and heat resistance.

Illustrative examples of the fatty acid (b-1) include behenic acid, oleic acid, arachidic acid and lignoceric acid, with behenic acid being preferred. The fatty acid derivatives (b-1) are typified by derivatives of the aforementioned fatty acids and will be illustrated later.

Component (b-2) is an oxidized natural wax and/or natural wax derivative having a neutralization value of 60 to 190 mg KOH/g, preferably 100 to 180 mg KOH/g. Too low a neutralization value detracts from resilience whereas too high a neutralization value detracts from flow and heat resistance.

Examples of the oxidized natural wax (b-2) include carnauba wax, rice wax, and montan wax in oxidized form, with the oxidized montan wax being preferred. As the natural wax derivative, used may be made of crude wax with a neutralization value of 60 to 190 mg KOH/g having undergone no work-up step. The natural wax derivatives will be illustrated later.

The fatty acid derivatives (b-1) and natural wax derivatives (b-2) used herein include derivatives in which the proton on the acid group or the hydroxyl group portion of the fatty acid (b-1) or oxidized natural wax (b-2) has been substituted. Such examples include metal soaps which are metal ion-neutralized products, saponified natural waxes, partially saponified esters resulting from partial saponification of the fatty acids or natural waxes, esterified products, and amidated products. When the fatty acid derivatives are in the form of metallic soaps or saponified natural waxes, the metal ions that are used for neutralization or saponification include $Li^+$, $Ca^{2+}$, $Mg^{2+}$, $Zn^{2+}$, $Mn^{2+}$, $Al^{3+}$, $Ni^{2+}$, $Fe^{2+}$, $Fe^{3+}$, $Cu^{2+}$, $Sn^{2+}$, $Pb^{2+}$ and $Co^{2+}$. Of these $Ca^{2+}$, $Mg^{2+}$ and $Zn^{2+}$ are especially preferred.

Illustrative examples of the metal soap include magnesium arachidate, potassium arachidate, zinc arachidate, magnesium behenate, calcium behenate, zinc behenate, magnesium lignocerate, calcium lignocerate, and zinc lignocerate. Examples of the saponified natural wax include saponified products of carnauba wax, rice wax and montan wax. Of these, magnesium behenate, calcium behenate, zinc behenate and saponified montan wax are preferred.

Illustrative examples of the amidated fatty acid and amidated natural wax include fatty acid amides (primary amides $RCONH_2$) and N-substituted fatty acid amide (secondary amides, exemplified by $RCONH(CH_2)_nNHCOR$), for example, saturated fatty acid amides, unsaturated fatty acid amides, hydroxyfatty acid amides, N-methylol fatty acid amides, N,N'-methylene fatty acid amides, N,N'-ethylene fatty acid amides, carnauba wax amide, rice wax amide, and montan wax amide. Of these, fatty acid amides and montan wax amide are preferred.

The fatty acid derivative (b-1) should have 20 to 80 carbon atoms. This range of carbon atom number is considered in the derivative form. Therefore, fatty acid derivatives having 20–80 carbon atoms obtained by condensing two or more molecules of fatty acid having less than 20 carbon atoms per molecule are useful. Use may be made of, for example, ethylene glycol-condensed esters and ethylene diamine-condensed amides of such fatty acids as lauric acid, myristic acid, palmitic acid and stearic acid, with the ethylene diamine-condensed products of stearic acid being especially preferred.

Examples of the esterified products include synthetic waxes of oil and fat type such as monohydric alcohol fatty acid esters, glycerin fatty acid esters, glycol fatty acid esters, and sorbitan fatty acid esters as well as esterified carnauba waxes, esterified rice waxes, and esterified montan waxes, with the esterified montan waxes being especially preferred.

As mentioned above, crude waxes may be used as the esterified natural wax. Useful examples are crude waxes having a fatty acid ester content of at least 50%, preferably at least 70%, and having in oxidized form a neutralization value of 60 to 190 mg KOH/g, preferably 100 to 180 mg KOH/g, which have not been worked up.

In the first form of the invention, the resin composition for the golf ball is obtained by blending 100 parts by weight of the thermoplastic resin component (A) with 0.1 part by weight or more and up to 10 parts, preferably up to 6 parts, more preferably up to 3 parts by weight of the wax component (B). Too low a proportion of wax component (B) relative to component (A) fails to achieve the desired resilience and flow-improving effects whereas too high a proportion of wax component (B) detracts from heat resistance.

In the first form, any suitable ones selected from (a-1) to (a-3) and (b-1) to (b-2), respectively, may be compounded as the thermoplastic resin component (A) and the wax component (B). In one preferred practice, the wax component (B) is selected in accordance with a particular type of component (A).

More specifically, in one preferred embodiment, at least one thermoplastic resin is selected as the essential component in (A) from the group consisting of (a-1) the olefin-unsaturated carboxylic acid random copolymer and the olefin-unsaturated carboxylic acid-unsaturated carboxylate ternary copolymer and (a-2) the metal ion-neutralized product of olefin-unsaturated carboxylic acid random copolymer and the metal ion-neutralized product of olefin-unsaturated carboxylic acid-unsaturated carboxylate ternary copolymer. In this preferred embodiment, it is desired to blend the thermoplastic elastomer (a-3) as the optional component in an amount of from 0 part by weight or more and up to 100 parts, more preferably up to 50 parts, even more preferably up to 30 parts by weight per 100 parts by weight of (a-1) and/or (a-2) to formulate component (A). In order to improve the compatibility and heat resistance of component (A) in this embodiment, it is recommended to blend as component (B) any one selected from among the above-mentioned metal soaps, fatty acids, oxidized natural waxes, saponified natural waxes, esterified fatty acids, esterified natural waxes, amidated fatty acids, and amidated natural waxes, preferably from among metal soaps, saponified natural waxes, fatty acids, and oxidized natural waxes, and especially from among behenic acid, calcium behenate, oxidized montan wax, and saponified montan wax.

In another preferred embodiment wherein the thermoplastic elastomer (a-3) is used as the essential component in (A), it is desired to blend at least one thermoplastic resin selected from among (a-1) the olefin-unsaturated carboxylic acid random copolymer and the olefin-unsaturated carboxylic acid-unsaturated carboxylate ternary copolymer and (a-2) the metal ion-neutralized product of olefin-unsaturated carboxylic acid random copolymer and the metal ion-neutralized product of olefin-unsaturated carboxylic acid-unsaturated carboxylate ternary copolymer, as the optional component in an amount of from 0 part by weight or more and up to 100 parts, more preferably up to 50 parts, even more preferably up to 30 parts by weight per 100 parts by weight of (a-3) to formulate component (A). In order to improve the compatibility and heat resistance of component (A) in this embodiment, it is recommended to blend as component (B) any one selected from among the above-mentioned metal soaps, saponified natural waxes, fatty acids, oxidized natural waxes, esterified fatty acids, esterified natural waxes, amidated fatty acids, and amidated natural waxes, more preferably from among fatty acids, oxidized natural waxes, esterified fatty acids, esterified natural waxes, amidated fatty acids, and amidated natural waxes, and especially from among ethylene bisstearoamide and esterified montan wax.

In either of the above preferred embodiments, the blend ratio (weight ratio) of (a-1) to (a-2) is generally from 10:90 to 90:10, preferably from 20:80 to 80:20, and more preferably from 30:70 to 70:30. Less than 10% by weight of (a-1) may detract from moldability whereas more than 90% by weight of (a-1) may lower resilience.

Next, in the second form of the invention, the resin composition for the golf ball contains the thermoplastic resin component (A), the wax component (B), both defined above, and (C) a basic inorganic metal compound capable of neutralizing acid groups in the thermoplastic resin component (A) and/or the wax component (B), all as essential components.

The basic inorganic metal compounds (C) include, for example, monoxides, hydroxides and carbonates of metals. It is recommended that the basic inorganic metal compound be selected from monoxides and hydroxides of metals. These basic inorganic metal compounds are highly reactive with components (A) and (B) and form reaction products free of organic matter so that they can increase the degree of neutralization of heated mixture without detracting from heat resistance.

Component (C) serves to neutralize acid groups in component (A) and/or (B) to increase the degree of neutralization of acid groups for thereby increasing the resilience of cured composition. Component (C) also serves to control free fatty acids for enhancing the heat resistance of the resin composition for the golf ball and endowing the composition with advantageous properties including moldability.

The metal species used in the basic inorganic metal compound (C) include Li, Na, K, Ca, Mg, Zn, Al, Ni, Fe, Cu, Mn, Sn, Pb, and Co, but are not limited thereto. The inorganic metal compounds include basic inorganic fillers containing these metals, for example, magnesium oxide, magnesium hydroxide, magnesium carbonate, zinc carbonate, zinc oxide, sodium hydroxide, sodium carbonate, calcium oxide, calcium hydroxide, lithium hydroxide, and lithium carbonate. As mentioned above, monoxides and hydroxides of these metal species are preferred. In particular, calcium hydroxide and magnesium oxide are preferred because of their high reactivity with components (A) and (B), with calcium hydroxide being especially preferred.

In the second form, the blending proportion of thermoplastic resin component (A), wax component (B) and basic inorganic metal compound (C) should be such that per 100 parts by weight of component (A), the amount of component (B) is at least 5 parts, preferably at least 10 parts, more preferably at least 15 parts, and up to 35 parts, preferably up to 30 parts, more preferably up to 25 parts, and the amount of component (C) is at least 0.1 part, preferably at least 1 part, more preferably at least 2 parts, and up to 10 parts, preferably up to 8 parts, more preferably up to 6 parts, all expressed in parts by weight. Too small an amount of component (B) detracts from resilience and flow whereas too large an amount of component (B) adversely affects durability. Too small an amount of component (C) fails to improve heat resistance and resilience whereas too large an amount of component (C) rather lowers the heat resistance of the composition.

In the resin composition for the golf ball according to the second form, any suitable one or a mixture of two or more selected from (a-1) to (a-3) may be compounded as the thermoplastic resin component (A). In one preferred, though not limited, practice, component (A) is selected so that component (C) may exert more additive effects.

More specifically, in one preferred embodiment, at least one thermoplastic resin is selected as the essential component in (A) from the group consisting of (a-1) the olefin-unsaturated carboxylic acid random copolymer and the olefin-unsaturated carboxylic acid-unsaturated carboxylate ternary copolymer and (a-2) the metal ion-neutralized product of olefin-unsaturated carboxylic acid random copolymer and the metal ion-neutralized product of olefin-unsaturated carboxylic acid-unsaturated carboxylate ternary copolymer. In this preferred embodiment, it is recommended to blend the thermoplastic elastomer (a-3) as the optional component in an amount of from 0 part or more and up to 100 parts, more preferably up to 50 parts, even more preferably up to 30 parts by weight per 100 parts by weight of (a-1) and/or (a-2) to formulate component (A). If the amount of (a-3) is too large, the degree of neutralization of acid groups by the basic inorganic metal compound (C) may become low, failing to improve resilience.

In the above embodiment, component (B) is generally selected from among the above-mentioned metal soaps, saponified natural waxes, fatty acids, oxidized natural waxes, esterified fatty acids, esterified natural waxes, amidated fatty acids, and amidated natural waxes. In order to improve the compatibility and heat resistance of component (A) in this embodiment, it is recommended to blend component (B) selected from among more compatible ones such as metal soaps, fatty acids, oxidized natural waxes, and saponified natural waxes, and especially from among behenic acid, calcium behenate, oxidized montan wax and saponified montan wax.

In the above embodiment, when (a-1) and (a-2) are used in admixture, each of (a-1) and (a-2) may be a single species or a mixture of two or more species. When a mixture of (a-1) and (a-2) is used, their mixing ratio is not critical, but (a-1) and (a-2) are usually mixed in a weight ratio of from 10:90 to 90:10, preferably from 20:80 to 80:20, and more preferably from 30:70 to 70:30. Less than 10% of (a-1) may lower moldability whereas more than 90% of (a-1) has a possibility of resilience decreasing.

The resin composition for the golf ball may take either the first form or the second form described above. In either form, each of the compounds exemplified above as (a-1) to (a-3) in component (A), (b-1) and (b-2) in component (B), and component (C) may be used alone or in admixture of two or more.

For example, an exemplary mixture of two or more species used as (a-1) is a mixture of an ethylene-methacrylic acid copolymer and an ethylene-methacrylic acid-acrylate ternary copolymer; exemplary mixtures of two or more species used as (a-2) are a mixture of a binary ionomer resin and a ternary ionomer resin and a mixture of ionomer resins neutralized with different metal species; an exemplary mixture of two or more species used as (B) is a mixture of a fatty acid and a natural wax; and exemplary mixtures of two or more species used as (C) are mixtures of oxides and/or hydroxides of different metal species.

The resin composition for the golf ball in either the first or the second form of the invention may be prepared by mixing the essential components in a well-known manner. The preparation method is not critical. For example, the essential components are mixed in a mixer, typically an internal mixer such as a kneading twin-screw extruder, Banbury mixer or kneader while heating at a temperature of about 150 to 250° C. Depending on a particular application of the composition, suitable additives may be added in the mixing step.

The resin composition for the golf ball in either the first or the second form of the invention, when processed into a heated mixture, should preferably have a melt index of at least 0.5 dg/min, more preferably at least 1.0 dg/min, and most preferably at least 1.5 dg/min, as measured in accordance with JIS-K6760 at a temperature of 190° C. and under a load of 21 N (2.16 kgf).

Since the resin composition of the invention is effectively flowable, moldable and heat resistant and affords molded parts having improved durability and resilience, it can be widely used in forming high-performance golf balls.

Therefore, the resin composition of the invention is useful as a resin component to form any constituent layer of various golf balls, for example, as cover material, intermediate layer material for multilayer structure golf balls, core material for solid cores or solid centers, and one-piece golf ball material.

Since the resin composition for the golf ball of the invention is improved in pigment dispersion and after curing, amenable to surface treatment such as stamping, it is advantageously used as a golf ball cover material, which can take advantage of the composition's own excellent properties. Depending on the cover structure of a golf ball to be manufactured, the item formed of the inventive resin composition may be a single cover or at least one layer of two or more cover layers. To take advantage of the composition's own excellent properties, it is recommended that the item be the outermost layer.

Where the inventive resin composition for the golf ball is used as a cover material, a pigment is often compounded therein. Such pigments are, for example, titanium dioxide, barium sulfate and calcium carbonate, with titanium dioxide being preferred. The amount of pigment blended is usually at least 0.1 part, especially at least 1 part by weight and up to 8 parts, especially up to 6 parts by weight per 100 parts by weight of the inventive resin composition.

In the cover material, there may be added other additives as dispersants, antioxidants, ultraviolet absorbers and light stabilizers. For the cover material, these additives may generally be blended in amounts of at least 0.1 part, especially at least 2 parts by weight, and up to 10 parts, especially up to 8 parts by weight per 100 parts by weight of the inventive resin composition.

The application of the inventive resin composition for the golf ball is not limited to the cover material, and it is advantageously applicable as a resinous composition or resinous ingredient in the core material, solid center material, one-piece golf ball material, and intermediate layer material as mentioned above. Depending on a particular application, suitable additives are selected and blended in the resin composition for the golf ball.

It is not critical how to blend various additives other than the inventive composition. One exemplary procedure is by blending additives together with the inventive resin composition and then simultaneously heating and mixing them. An alternative procedure is by preheating the inventive resin composition, adding additives thereto, followed by further heating and mixing.

Also contemplated herein is a golf ball having a layer formed of a material comprising the above-described resin composition for the golf ball. There are many advantages including high heat resistance, good flow and effective molding from the material aspect and improved durability and rebound from the layer aspect.

In the golf balls of the invention, the inventive resin composition for the golf ball may be used as a compounding component in any of cover material, core material, solid center material, and one-piece golf ball material. Differently stated, the golf balls of the invention encompass wound golf balls (in which the cover may have either a single layer structure or a multilayer structure of two or more layers), one-piece golf balls, two-piece golf balls, three-piece golf balls, and multi-piece golf balls (in which the cover has three or more layers).

Preferred golf balls are those having the cover of a single layer or at least two layers wherein the single layer or one layer is formed of a material comprising the inventive resin composition for the golf ball. It is recommended to use the inventive resin composition for the golf ball as a base resin in the cover material. The cover formed of such material may be the outermost layer, one layer other than the outermost layer, or at least one layer of the inner cover of two or more layers. Since the inventive resin composition is improved in pigment dispersion and after curing, amenable to surface treatment such as stamping as previously described, it is recommended to use the inventive resin composition in the cover outermost layer.

As mentioned above, the golf ball of the invention may be any of wound golf balls, one-piece golf balls, two-piece golf balls, three-piece golf balls, and multi-piece golf balls (in which the cover has three or more layers). As long as the ball has a layer of a material having the inventive resin composition for the golf ball compounded therein, the manufacturing process is not critical and any well-known process may be employed.

Described below as typical examples are a solid golf ball and a wound golf ball in which a cover is formed on a well-known solid core or wound core, using a cover material based on the inventive resin composition for the golf ball.

In either case, a core is first prepared by a known method. For example, a solid core may be produced by blending 100 parts by weight of cis-1,4-polybutadiene as base rubber; from 10 to 60 parts by weight of one or more vulcanizing or crosslinking agents selected from among $\alpha,\beta$-monoethylenically unsaturated carboxylic acids (e.g., acrylic acid, methacrylic acid) or metal salts thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The resulting rubber composition is molded by press vulcanization to effect crosslinkage, followed by compression under heating at 140 to 170° C. for a period of 10 to 40 minutes, forming a spherical solid core. The solid core may include a plurality of layers and such a multilayer core may also be produced by a known method.

For the thread-wound golf ball, a wound core is prepared by forming either a liquid or a solid center and winding rubber thread around the center. In the case of a liquid center, a hollow spherical center envelope may be formed from a rubber or thermoplastic elastomer compound, for example, and a liquid filled into this envelope by a well-known method. If a solid center is used instead, the solid center may be produced by the solid core production method described above. Rubber thread is then wound in a stretched state about the center by a known winding method, forming the wound core. Use may be made of rubber thread produced by a conventional method. For example, a rubber composition is prepared by compounding natural rubber or synthetic rubber such as polyisoprene with various additives (e.g., antioxidants, vulcanization accelerators and sulfur), extruded and vulcanized.

In the manufacture of golf balls, the inventive resin composition for the golf ball is suitably formulated and processed into a heated mixture suitable as a cover material (for at least one layer in case the cover includes two or more layers) for wound golf balls and solid golf balls, followed by molding in a conventional way.

When a golf ball is manufactured using any one of the above-mentioned cores, a cover material having the inventive resin composition for the golf ball compounded therein may be molded over the core to form a cover. Illustratively, a single-layer or multi-layer solid core or wound core prefabricated according to the type of ball to be manufactured is placed in a mold, and the cover material is heated, mixed and melted, then injection-molded over the core.

The method of forming the cover is not limited to the injection molding described above. For example, use may be made of a compression molding method in which a pair of hemispherical cups is molded from the cover material, following which the cups are placed over a core and molded under heat (120 to 170° C.) and pressure for 1 to 5 minutes.

No particular limitation is imposed on the thickness of the cover made of the cover material based on the inventive resin composition for the golf ball, although the cover is generally formed to a thickness of at least 1 mm, and preferably at least 1.3 mm, but not more than 4 mm, and preferably not more than 2.3 mm.

In one preferred embodiment of the golf ball according to the invention, the cover in the case of a golf ball comprising a core and a cover formed around the core, or at least one cover layer in the case of a golf ball comprising a core and a cover formed around the core and having a multilayer structure of two or more layers, is formed of a material having the inventive resin composition for the golf ball compounded therein (sometimes referred to as "inventive cover material"). This affords many advantages including heat resistance, good flow and effective molding during the manufacturing process and improved durability and rebound as ball products. Especially in the latter golf ball having a cover consisting of two or more layers, the inventive cover material may be used in either the outermost layer or any inside layer (or intermediate layer). From the advantages of pigment dispersion and stamping treatment, it is preferred that the inventive cover material be used in the outermost layer. Particularly when the outermost layer is formed of the inventive cover material and the inside layer is formed of a known cover stock as typified by ionomer resin, the inventive outermost layer cooperates with the conventional inside layer in a synergistic manner to provide outstandingly improved rebound and durability.

The surface of the cover may have a plurality of dimples formed thereon, and the cover may be administered various treatment such as surface preparation, stamping and painting. In particular, the ease of work involved in administering such surface treatment to a golf ball cover made of the inventive cover material can be improved by the good processability of the cover surface. The resulting golf ball has an outer appearance of quality.

In the golf balls manufactured as described above, the diameter, weight, hardness and other parameters of the cover, solid or liquid center, solid core or thread-wound core, and one-piece golf balls, while not subject to any particular limitations, may be adjusted as appropriate, insofar as the objects of the invention are attainable.

The golf ball of the invention may be manufactured for use in tournaments by giving it a diameter and weight which conform with the Rules of Golf. That is, the ball may be produced to a diameter of not less than 42.67 mm and a weight of not greater than 45.93 g.

The resin composition for the golf ball of the invention is improved in heat resistance, flow and moldability. Since the golf ball of the invention has a layer which is arrived at by making use of a material having the inventive resin composition for the golf ball compounded therein, it can be manufactured easily and efficiently, and has excellent rebound, long distance and durability.

EXAMPLE

Examples of the invention and comparative examples are given below by way of illustration, and are not intended to limit the invention.

Examples 1–7 and Comparative Examples 1–6

Using a core material composed primarily of cis-1,4-polybutadiene, a solid core A was produced having a diameter of 38.6 mm, a weight of 35.0 g, and a deflection of 3.2 mm under a load of 981 N (100 kgf).

Cover materials of the compositions shown in Tables 1 and 2 were mixed at 200° C. in a kneading-type twin-screw extruder and prepared in the form of pellets. In each of the examples, the cover material was injected into a mold in which the solid core A prepared above had been placed, giving a two-piece solid golf ball having a cover of 2.1 mm thick and a diameter of 42.8 mm.

Example 8 and Comparative Examples 7–9

Using a core material composed primarily of cis-1,4-polybutadiene, a solid core B was produced having a diameter of 35.4 mm, a weight of 27.1 g, and a deflection of 4.0 mm under a load of 981 N (100 kgf).

The intermediate layer material shown in Table 3 was injection molded around the solid core B to a thickness of 1.7 mm. The outer layer material (cover material) shown in Table 3 was injection molded therearound to a thickness of 2 mm, giving a three-piece solid golf ball having a diameter of 42.8 mm.

Example 9 and Comparative Examples 10–11

Using a core material composed primarily of cis-1,4-polybutadiene, a solid core C was produced having a diameter of 36.4 mm, a weight of 29.4 g, and a deflection of 3.7 mm under a load of 981 N (100 kgf).

The intermediate layer material shown in Table 4 was injection molded around the solid core C to a thickness of 1.7 mm. The outer layer material (cover material) shown in Table 4 was injection molded therearound to a thickness of 1.5 mm, giving a three-piece solid golf ball having a diameter of 42.8 mm.

The golf balls were examined for several characteristics by the following methods. The results are shown in Tables 1 to 4.

Ball Hardness

Measured as the deflection (in millimeters) of the ball under a load of 981 N (100 kgf).

Initial Velocity

Measured using the same type of initial velocity instrument as approved by the United States Golf Association (USGA), and in accordance with USGA rules.

Heat Resistance

To avoid any influence of moisture, a sample was dewatered by pressurizing at 120° C. The sample, about 5 mg, was subjected to thermogravimetric analysis by heating from 25° C. to 300° C. at a heating rate of 10° C./min in a nitrogen atmosphere (flow rate 100 ml/min). A percent loss of the weight at 250° C. from the weight at 25° C. was calculated, and heat resistance was evaluated according to the following criterion.

O: heat loss is not more than 2.5%
X: heat loss is more than 2.5%

Reject Rate of Stamping 1,000 golf balls were molded from each cover material and held for 24 hours at room temperature before stamping was carried out thereon. A rate of defective stamping by dispersant bleeding was determined.

Melt Flow Rate

The melt flow rate of the material was measured in accordance with JIS-K6760 at a temperature of 190° C. and under a load of 21 N (2.16 kgf).

Pigment Dispersion

Each material was kneaded in a co-rotational intermeshing twin-screw extruder (screw diameter 32 mm, main motor power 7.5 kW) of the ordinary type at 200° C. The kneaded material was visually observed and evaluated according to the following criterion.

O: no pigment agglomerated
X: pigment agglomerated

Trade names and materials mentioned in the tables are described below.

Nucrel AN4318: ethylene-methacrylic acid-butyl acrylate copolymer with an acid content of 8 wt %, DuPont-Mitsui Polychemicals Co., Ltd.

Nucrel 1560: ethylene-methacrylic acid copolymer with an acid content of 15 wt %, DuPont-Mitsui Polychemicals Co., Ltd.

Himilan 1706: zinc ion-neutralized ethylene-methacrylic acid copolymer with an acid content of 15 wt %, DuPont-Mitsui Polychemicals Co., Ltd.

Himilan 1605: sodium ion-neutralized ethylene-methacrylic acid copolymer with an acid content of 15 wt %, DuPont-Mitsui Polychemicals Co., Ltd.

Hytrel 4001: thermoplastic polyester elastomer, DuPont-Toray Polychemicals Co., Ltd.

Pandex T-7298: thermoplastic polyurethane elastomer, Dainippon Ink & Chemicals, Inc.

Behenic acid: fatty acid (molecular formula: $C_{21}H_{43}COOH$, carbon number 22, neutralization value 161–169 mg KOH/g, trade name: NAA222-S, NOF Corp.

Calcium behenate: calcium ion-neutralized product of fatty acid (molecular formula: $C_{21}H_{43}COOH$, carbon number 22), NOF Corp.

Magnesium stearate: carbon number 18, trade name: Magnesium Stearate, NOF Corp.

Calcium stearate: carbon number 18, trade name: Calcium Stearate, NOF Corp.

Polyethylene wax: average molecular weight 1500, carbon number $\geq 65$, trade name: Sunwax 171-P, Sanyo Chemicals Co., Ltd.

Acid-modified polyethylene wax: average molecular weight 3500, carbon number $\geq 65$, neutralization value 30 mg KOH/g, trade name: Umex 2000, Sanyo Chemicals Co., Ltd.

Fatty acid amide: ethylene bisstearoamide (molecular formula: $C_{17}H_{35}CONHCH_2CH_2HNOCH_{35}C_{17}$, carbon number 38, ethylene diamine-condensed product of stearic acid Fatty acid ester: methyl laurate (molecular formula: $C_{11}H_{23}COCH_3$, carbon number 13)

Oxidized montan wax: neutralization value 135–155 mg KOH/g, trade name Hoechst Wax S, Hoechst Co.

Esterified montan wax: glycol-esterified product of oxidized montan wax, trade name Hoechst Wax E, Hoechst Co.

TABLE 1

| | | | Example 1 | Example 2 | Example 3 | Example 4 | Example 5 | Example 6 | Example 7 |
|---|---|---|---|---|---|---|---|---|---|
| Core | | | A | A | A | A | A | A | A |
| Cover material composition | (a-1) | Nucrel AN4318 | | | 20 | | | | 20 |
| | | Nucrel 1560 | | | | 100 | 100 | | 80 |
| | (a-2) | Himilan 1706 | 50 | 50 | 40 | | | 50 | |
| | | Himilan 1605 | 50 | 50 | 40 | | | 50 | |
| | (b-1) | Behenic acid | | | | 20 | | 20 | 20 |
| | | Calcium behenate | 3 | | 3 | | | | |
| | (b-2) | Oxidized montan wax | | 3 | | | 20 | | |
| | (C) | Calcium hydroxide | | | | 6 | 5.8 | 3.2 | 5.5 |
| | Other | Titanium dioxide | 4 | 4 | 4 | 4 | 4 | 4 | 4 |
| Cover material physical properties | | Melt flow rate (dg/min) | 2.2 | 2.5 | 5.9 | 2.0 | 2.0 | 2.0 | 2.0 |
| | | Pigment dispersion | ○ | ○ | ○ | ○ | ○ | ○ | ○ |
| | | Heat resistance | ○ | ○ | ○ | ○ | ○ | ○ | ○ |
| | | Reject rate of stamping (%) | 0 | 0 | 0 | 0 | 0 | 0 | 0 |
| | | Hardness (Shore D) | 63 | 63 | 58 | 65 | 64 | 65 | 60 |
| | | Specific gravity | 0.98 | 0.98 | 0.98 | 0.97 | 0.97 | 0.97 | 0.97 |
| Ball physical properties | | Weight (g) | 45.2 | 45.2 | 45.2 | 45.2 | 45.2 | 45.2 | 45.2 |
| | | Hardness (mm) | 2.60 | 2.60 | 2.85 | 2.50 | 2.55 | 2.50 | 2.75 |
| | | Initial velocity (m/s) | 77.2 | 77.2 | 76.8 | 77.5 | 77.4 | 77.5 | 77.2 |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Core | | | A | A | A | A | A | A |
| Cover material composition | (a-1) | Nucrel AN4318 | | | | | 20 | |
| | (a-2) | Himilan 1706 | 50 | 50 | 50 | 40 | 50 | 50 |
| | | Himilan 1605 | 50 | 50 | 50 | 40 | 50 | 50 |
| | (b-1) | Calcium behenate | | | | | 20 | |
| | Others | Magnesium stearate | 3 | | | 3 | | |
| | | Calcium stearate | | | | | | 20 |
| | | Polyethylene wax | | 3 | | | | |
| | | Acid-modified polyethylene wax | | | 3 | | | |
| | | Titanium dioxide | 4 | 4 | 4 | 4 | 4 | 4 |
| Cover material physical properties | | Melt flow rate (dg/min) | 1.8 | 1.8 | 1.8 | 5.4 | 3.8 | 2.8 |
| | | Pigment dispersion | ○ | ○ | ○ | ○ | ○ | ○ |
| | | Heat resistance | X | ○ | ○ | X | X | X |
| | | Reject rate of stamping (%) | 3 | 0 | 0 | 3 | 5 | 4 |
| | | Hardness (Shore D) | 65 | 62 | 62 | 60 | 67 | 66 |
| | | Specific gravity | 0.98 | 0.98 | 0.98 | 0.98 | 0.97 | 0.97 |
| Ball physical properties | | Weight (g) | 45.2 | 45.2 | 45.2 | 45.2 | 45.2 | 45.2 |
| | | Hardness (mm) | 2.50 | 2.65 | 2.65 | 2.75 | 2.40 | 2.45 |
| | | Initial velocity (m/s) | 77.2 | 76.9 | 76.9 | 76.8 | 77.3 | 77.3 |

TABLE 3

| Core | | | Example 8 B | Comparative Example 7 B | Comparative Example 8 B | Comparative Example 9 B |
|---|---|---|---|---|---|---|
| Outer cover material composition | (a-3) | Hytrel 4001 | 100 | 100 | 100 | 100 |
| | (b-2) | Esterified montan wax | 3 | | | |
| | Others | Magnesium stearate | | 3 | | |
| | | Polyethylene wax | | | 3 | |
| | | Fatty acid ester | | | | 3 |
| | | Titanium dioxide | 4 | 4 | 4 | 4 |
| Intermediate layer composition | | Himilan 1605 | 50 | 50 | 50 | 50 |
| | | Himilan 1706 | 50 | 50 | 50 | 50 |
| | | Titanium dioxide | 4 | 4 | 4 | 4 |
| Intermediate layer | | Thickness (mm) | 1.7 | 1.7 | 1.7 | 1.7 |
| Outer cover material physical properties | | Melt flow rate (dg/min) | 11.2 | 10.0 | 9.5 | 11.0 |
| | | Pigment dispersion | ○ | × | × | ○ |
| | | Heat resistance | ○ | × | × | × |
| | | Reject rate of stamping (%) | 0 | 4 | 4 | 6 |
| | | Hardness (Shore D) | 40 | 42 | 40 | 40 |
| | | Specific gravity | 1.12 | 1.12 | 1.12 | 1.12 |
| Outer cover | | Thickness (mm) | 2.0 | 2.0 | 2.0 | 2.0 |
| Ball physical properties | | Weight (g) | 45.2 | 45.2 | 45.2 | 45.2 |
| | | Hardness (mm) | 3.00 | 2.90 | 3.00 | 3.00 |
| | | Initial velocity (m/s) | 77.1 | 77.0 | 76.8 | 77.1 |

TABLE 4

| Core | | | Example 9 C | Comparative Example 10 C | Comparative Example 11 C |
|---|---|---|---|---|---|
| Outer cover material composition | (a-3) | Pandex T-7298 | 100 | 100 | 100 |
| | (b-1) | Fatty acid amide | 0.4 | | |
| | (b-2) | Esterified montan wax | 0.2 | | |
| | Others | Magnesium stearate | | 0.6 | |
| | | Polyethylene wax | | | 0.6 |
| | | Titanium dioxide | 2 | 2 | 2 |
| Intermediate layer composition | | Himilan 1605 | 40 | 40 | 40 |
| | | Himilan 1706 | 40 | 40 | 40 |
| | | Nucrel AN4318 | 20 | 20 | 20 |
| | | Titanium dioxide | 2 | 2 | 2 |
| Intermediate layer | | Thickness (mm) | 1.7 | 1.7 | 1.7 |
| Outer cover material physical properties | | Melt flow rate (dg/min) | 6.7 | 6.0 | 5.5 |
| | | Pigment dispersion | ○ | × | × |
| | | Heat resistance | ○ | × | × |
| | | Reject rate of stamping (%) | 0 | 4 | 4 |
| | | Hardness (Shore D) | 47 | 49 | 47 |
| | | Specific gravity | 1.16 | 1.16 | 1.16 |
| Outer cover | | Thickness (mm) | 1.5 | 1.5 | 1.5 |
| Ball physical properties | | Weight (g) | 45.2 | 45.2 | 45.2 |
| | | Hardness (mm) | 3.00 | 2.90 | 3.00 |
| | | Initial velocity (m/s) | 76.7 | 76.6 | 76.5 |

The findings from Tables 1 to 4 are given below.

Examples 1–3 & Comparative Examples 1–4

As compared with the golf balls having conventional covers, the golf balls having covers formed of the cover materials according to the first form of the invention have the advantages of smooth flow, heat resistance and effective pigment dispersion during the manufacturing process as well as the advantages of satisfactory stamping and high rebound.

Examples 4–7 & Comparative Examples 1–6

As compared with the golf balls having conventional covers, the golf balls having covers formed of the cover materials according to the second form of the invention have the advantages of smooth flow, heat resistance and effective pigment dispersion during the manufacturing process as well as the advantages of satisfactory stamping and high rebound.

Example 8 & Comparative Examples 7–9

As compared with the golf balls having conventional outer cover layers, the golf ball having an outer cover layer formed of the outer cover material according to the first form of the invention have the advantages of smooth flow, heat resistance and effective pigment dispersion during the manufacturing process as well as the advantages of satisfactory stamping and high rebound.

Example 9 & Comparative Examples 10–11

As compared with the golf balls having conventional outer cover layers, the golf ball having an outer cover layer formed of the outer cover material according to the first form of the invention have the advantages of smooth flow, heat resistance and effective pigment dispersion during the manufacturing process as well as the advantages of satisfactory stamping and high rebound.

Japanese Patent Application No. 2000-173543 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A resin composition for a golf ball comprising, in admixture,
   (A) 100 parts by weight of at least one thermoplastic resin component selected from the group consisting of (a-1) an olefin-unsaturated carboxylic acid random copolymer and/or an olefin-unsaturated carboxylic acid-unsaturated carboxylate ternary copolymer, (a-2) a metal ion-neutralized product of an olefin-unsaturated carboxylic acid random copolymer and/or a metal ion-neutralized product of an olefin-unsaturated carboxylic acid-unsaturated carboxylate ternary copolymer, and (a-3) a thermoplastic elastomer, and
   (B) 0.1 to 10 parts by weight of at least one wax component selected from the group consisting of (b-1) a fatty acid having 20 to 80 carbon atoms and/or a derivative thereof, and (b-2) an oxidized natural wax and/or natural wax derivative having a neutralization value of 60 to 190 mg KOH/g.

2. The resin composition of claim 1 having a melt index of at least 0.5 dg/min.

3. The resin composition of claim 1 wherein component (b-1) is behenic acid and/or a derivative thereof.

4. The resin composition of claim 1 wherein component (b-2) is oxidized montan wax and/or montan wax derivative.

5. The resin composition of claim 1 wherein component (a-3) is at least one member selected from the group consisting of polyolefin, an olefin elastomer, a urethane elastomer, a polyester elastomer, a styrene elastomer and a polyamide elastomer.

6. The resin composition of claim 1 wherein component (A) contains at least one thermoplastic resin selected from the group consisting of (a-1) an olefin-unsaturated carboxylic acid random copolymer and an olefin-unsaturated carboxylic acid-unsaturated carboxylate ternary copolymer, and (a-2) a metal ion-neutralized product of an olefin-unsaturated carboxylic acid random copolymer and a metal ion-neutralized product of an olefin-unsaturated carboxylic acid-unsaturated carboxylate ternary copolymer.

7. The resin composition of claim 6 wherein wax component (B) is selected from the group consisting of a fatty acid, a metal soap, oxidized natural wax and saponified natural wax.

8. The resin composition of claim 1 wherein component (A) contains (a-3) the thermoplastic elastomer.

9. The resin composition of claim 8 wherein wax component (B) is selected from the group consisting of fatty acid, oxidized natural wax, esterified fatty acid, esterified natural wax, amidated fatty acid and amidated natural wax.

10. A resin composition for a golf ball comprising, in admixture, (A) 100 parts by weight of at least one thermoplastic resin component selected from the group consisting of (a-1) an olefin-unsaturated carboxylic acid random copolymer and/or an olefin-unsaturated carboxylic acid-unsaturated carboxylate ternary copolymer, (a-2) a metal ion-neutralized product of an olefin-unsaturated carboxylic acid random copolymer and/or a metal ion-neutralized product of an olefin-unsaturated carboxylic acid-unsaturated carboxylate ternary copolymer, and (a-3) a thermoplastic elastomer, (B) 5 to 35 parts by weight of at least one wax component selected from the group consisting of (b-1) a fatty acid having 20 to 80 carbon atoms and/or a derivative thereof, and (b-2) an oxidized natural wax and/or natural wax derivative having a neutralization value of 60 to 190 mg KOH/g, and (C) 0.1 to 10 parts by weight of a basic inorganic metal compound capable of neutralizing acid groups in said thermoplastic resin component (A) and/or said wax component (B).

11. The resin composition of claim 10 having a melt index of at least 0.5 dg/min.

12. The resin composition of claim 10 wherein component (b-1) is behenic acid and/or a derivative thereof.

13. The resin composition of claim 10 wherein component (b-2) is oxidized montan wax and/or montan wax derivative.

14. The resin composition of claim 10 wherein wax component (B) is selected from the group consisting of a fatty acid, a metal soap, oxidized natural wax and saponified natural wax.

15. The resin composition of claim 10 wherein the basic inorganic metal compound (C) is calcium hydroxide or magnesium oxide.

16. The resin composition of claim 10 wherein component (a-3) is at least one member selected from the group consisting of polyolefin, an olefin elastomer, a urethane elastomer, a polyester elastomer, a styrene elastomer and a polyamide elastomer.

17. The resin composition of claim 10 wherein component (A) contains at least one thermoplastic resin selected from the group consisting of (a-1) an olefin-unsaturated carboxylic acid random copolymer and an olefin-unsaturated carboxylic acid-unsaturated carboxylate ternary copolymer, and (a-2) a metal ion-neutralized product of an olefin-unsaturated carboxylic acid random copolymer and a metal ion-neutralized product of an olefin-unsaturated carboxylic acid-unsaturated carboxylate ternary copolymer.

18. A golf ball comprising a core and a cover formed around the core, the cover being formed of a material comprising the resin composition of claim 1.

19. A golf ball comprising a core and a cover of at least two layers formed around the core, at least one layer of said cover being formed of a material comprising composition of claim 1.

* * * * *